United States Patent
Zaich et al.

(10) Patent No.: US 10,878,524 B2
(45) Date of Patent: Dec. 29, 2020

(54) CONTINUOUS BACKGROUND CHECK MONITORING

(71) Applicant: Checkr, Inc., San Francisco, CA (US)

(72) Inventors: Paul Dolby Zaich, San Francisco, CA (US); Benjamin Jon Jacobson, Superior, CO (US); Jason Scott Dougherty, San Francisco, CA (US); Albert Ho, San Francisco, CA (US)

(73) Assignee: CHECKR, INC., San Francisco, CA (US)

( * ) Notice: Subject to any disclaimer, the term of this patent is extended or adjusted under 35 U.S.C. 154(b) by 0 days.

(21) Appl. No.: 16/366,778

(22) Filed: Mar. 27, 2019

(65) Prior Publication Data

US 2020/0250782 A1 Aug. 6, 2020

Related U.S. Application Data

(60) Provisional application No. 62/799,695, filed on Jan. 31, 2019.

(51) Int. Cl.
*G06Q 10/10* (2012.01)
*G06Q 10/00* (2012.01)
(Continued)

(52) U.S. Cl.
CPC ........... *G06Q 50/265* (2013.01); *G06F 16/24* (2019.01); *G06Q 10/105* (2013.01); *G06Q 10/1053* (2013.01)

(58) Field of Classification Search
CPC ............. G06Q 10/105; G06Q 10/1053; G06Q 50/265; G06F 16/24
(Continued)

(56) References Cited

U.S. PATENT DOCUMENTS 7,494,060 B2 * 2/2009 Zagami ............... G06Q 50/265
235/382
8,489,518 B2 7/2013 Levine et al.
(Continued)

OTHER PUBLICATIONS

Creating a New Standard of Safety in the Ridesharing Industry and Beyond, Checkr Blog, Jul. 13, 2018, 2 pages, downloaded at: https://medium.com/checkr-blog/creating-a-new-standard-of-safety-in-the-ridesharing-industry-and-beyond-ac43c660840e.
(Continued)

*Primary Examiner* — Jonathan P Ouellette
(74) *Attorney, Agent, or Firm* — Nicholson De Vos; Webster & Elliott LLP

(57) ABSTRACT

A candidate is enrolled for continuous background check monitoring where a computing system continually electronically monitors data sources that include background check data for data of the candidate for any changes or updates for the candidate, until the candidate is no longer enrolled. If a record is received, an identity matching process is performed to determine the probability the record belongs to the candidate. If the probability is below a threshold or manual review is desired, the system automatically triggers a manual review of the record to determine if it belongs to the candidate. If the system determines the record belongs to the candidate, a verification of the data may be triggered including triggering a county records search using the record as a pointer. The county records search may have more complete information. The system receives the results and automatically generates a report and transmits a notification of the report.

21 Claims, 6 Drawing Sheets

(51) Int. Cl.
*G06Q 10/08* (2012.01)
*G06Q 30/02* (2012.01)
*G06Q 30/08* (2012.01)
*G06Q 50/26* (2012.01)
*G06F 16/24* (2019.01)

(58) Field of Classification Search
USPC .................................................. 705/1.1–912
See application file for complete search history.

(56) References Cited

U.S. PATENT DOCUMENTS

| | | | |
|---|---|---|---|
| 9,734,642 B2 | 8/2017 | Mattern | |
| 2004/0044538 A1* | 3/2004 | Mauzy | G06Q 10/10 |
| | | | 705/321 |
| 2004/0088173 A1 | 5/2004 | Mather | |
| 2005/0055231 A1 | 3/2005 | Lee | |
| 2005/0273453 A1* | 12/2005 | Holloran | G06Q 10/10 |
| 2008/0033742 A1 | 2/2008 | Bernasconi | |
| 2010/0228792 A1* | 9/2010 | Gray | G06Q 10/06 |
| | | | 707/804 |
| 2012/0317174 A1* | 12/2012 | Miller | G06Q 10/06 |
| | | | 709/203 |
| 2016/0004880 A1* | 1/2016 | Collins | G06F 21/31 |
| | | | 726/28 |
| 2017/0374093 A1* | 12/2017 | Dhar | G06F 16/332 |
| 2020/0005416 A1* | 1/2020 | Wade | G06K 9/00087 |

OTHER PUBLICATIONS

Checkr Creates Dynamic Monitoring Tool to Elevate Safety in Ridesharing, Business Wire, Jul. 13, 2018, 2 pages, downloaded at: https://www.businesswire.com/news/home/20180713005186/en/Checkr-Creates-Dynamic-Monitoring-Tool-Elevate-Safety.

* cited by examiner

CONTINUOUS BACKGROUND CHECK MONITORING

CROSS-REFERENCE TO RELATED APPLICATIONS

This application claims the benefit of U.S. Provisional Application No. 62/799,695, filed Jan. 31, 2019, which is hereby incorporated by reference.

FIELD

Embodiments of the invention relate to the field of background checking; and more specifically, to continuous background check monitoring.

BACKGROUND

Background checks are often performed to research more about an individual such as learning if and to what extent they have a criminal background. Background checks are often requested by potential employers as part of their hiring process and used to determine the candidate's character and fitness for the job. Background checks are also used for non-employment reasons such as tenant screenings, the extension of insurance, and gaining access to online consumer platforms. Historically, the background check process has been a largely manual process that, due to its relative complexity, is performed only once prior to a job start date or gaining access to a platform. Further, there is not a comprehensive national criminal record database that includes truly complete and up to date information. This has pushed companies, through the use of Consumer Reporting Agencies (CRAs), to use a combination of commercially available data aggregators and boots on the ground court and record researchers to search for information broadly, and then verify information obtained from the data aggregators for accuracy and completeness. Verifying information most often involves accessing county courthouse records. These are obtained either via electronically available public access terminals or clerk assisted searches (in-person requests). That information is then passed from the researcher back to the CRA for compliance filtering and quality assurance. Traditionally, after some period of time, when an employer wishes to re-evaluate the fitness of a candidate for a job, this expensive and manual process must be requested and performed again, and conventionally is not done more than once a year. Because the results of background checks only include information that occurred prior to the search, the gap in time between requests creates potential risk exposure for companies relying on these checks for their screening diligence.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

A method and apparatus for continuous background check monitoring is described. A candidate is enrolled for continuous background check monitoring. The candidate may be enrolled by a third-party such as an employer or potential employer of the candidate. A continuous background check monitoring system automatically monitors multiple and disparate data sources for new or changed records for the candidate. By way of example, the continuous background check monitoring system may be connected with one or more real-time data sources that provide real-time information and/or one or more periodic data sources. Such real-time information may include arrest records that may be pushed to the continuous background check monitoring module and/or an internal database that includes completed background search results. The periodic databases may be external databases and periodically polled by the continuous background check monitoring module (e.g., daily, weekly, monthly). Example periodic information includes a national criminal search, global watchlist search, sex offender search, and online county search. If new data is found, the continuous background check monitoring module automatically generates a report that describes the found data. The report may be automatically sent to the third-party that enrolled the candidate for continuous background checking.

Unlike conventional background check processes that are largely manual and need to be requested again when re-evaluating a candidate or otherwise wanting an updated background check, the continuous background check monitoring described herein continuously monitors background check databases for changes and/or updates to the background data of the candidate. This reduces the complexity of the background check process and reduces the cost of running a full background check. This allows employers (or other entities) to monitor background check information post-hire, on an ongoing basis, to continuously qualify fitness for the job, for example.

Figure 1:
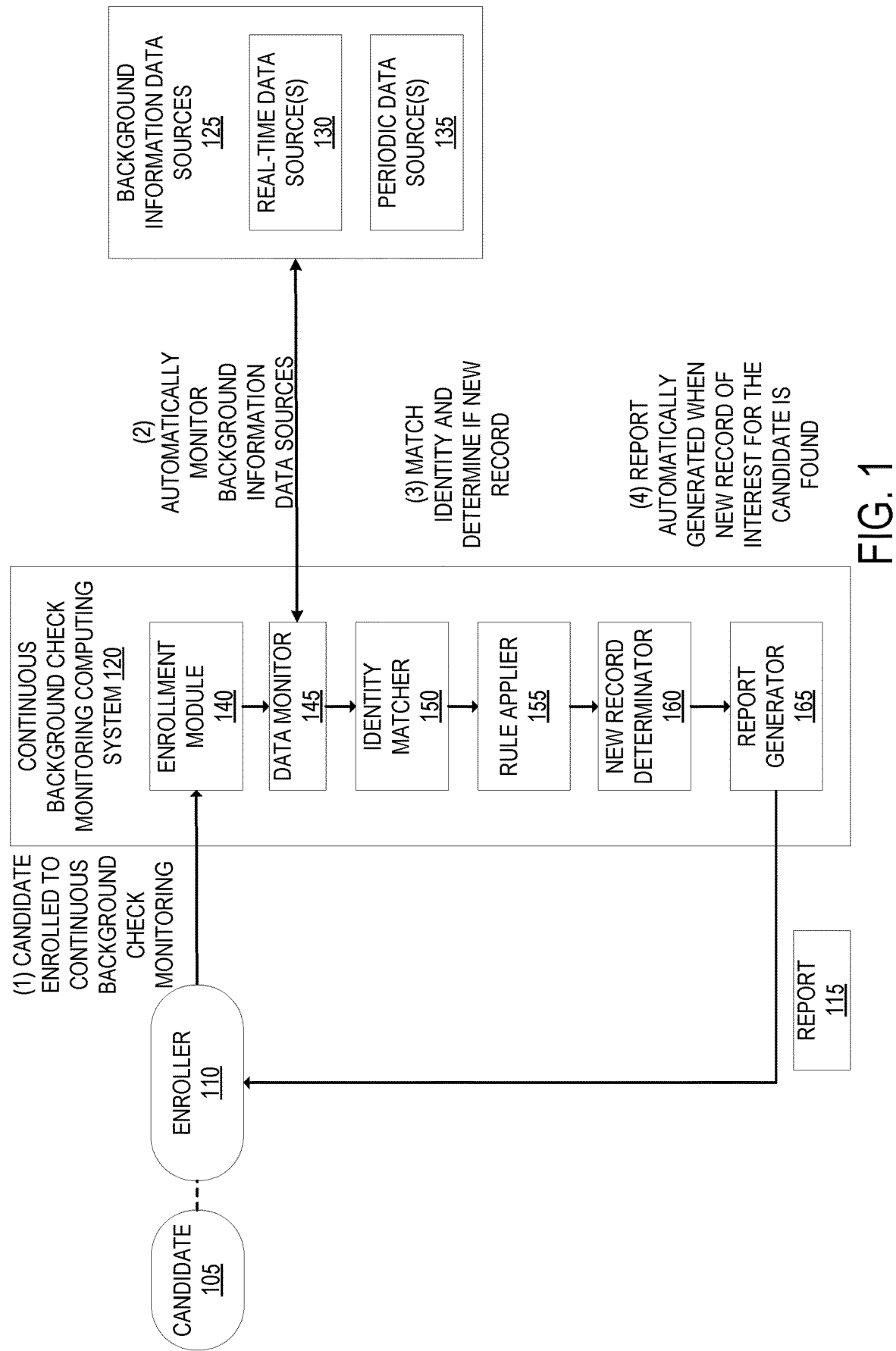
FIG. 1 is a block diagram that illustrates an exemplary continuous background check monitoring system according to an embodiment.

FIG. 1 is a block diagram that illustrates an exemplary continuous background check monitoring system according to an embodiment. The continuous background check monitoring system includes the continuous background check monitoring computing system 120 which is a set of one or more computing devices that perform the continuous background check monitoring described herein. The continuous background check monitoring computing system 120 includes various components to perform the continuous background check monitoring including the enrollment module 140, the data monitor 145, the identity matcher 150, the rule applier 155, the new record determinator 160, and the report generator 165.

A candidate 105 is enrolled for continuous background check monitoring at the continuous background check monitoring computing system 120 at operation 1 through the enrollment module 140. The enroller 110, which may be a third-party such as an employer or potential employer of the candidate 105, may cause the candidate 105 to be enrolled for continuous background check monitoring. As used herein, continuous means that the background checking process described herein occurs continuously until the candidate is unenrolled from continuous background check monitoring. The candidate 105 may be unenrolled after a predetermined amount of time has elapsed and/or responsive to the enroller 110 causing the candidate to be unenrolled (e.g., the candidate may be removed from the employer's workforce and/or no longer be considered for employment). Although the term candidate is used herein, the individual whose background check is being continuously monitored is not necessarily a job applicant or employee. Instead, the term candidate is used exemplary and applies to any individual for which a background check is being continuously monitored.

In an embodiment, the continuous background check monitoring computing system 120 receives enrollment information from the enroller 110 and/or the candidate 105 about the candidate 105 including candidate information such as personal identifiable information (PII) of the candidate 105. For instance, the enrollment module 140 may be available over the Internet to allow the enroller 110 and/or the candidate 105 to provide enrollment information. The enrollment information is used by the continuous background check monitoring computing system 120 to perform the background check monitoring. The PII of the candidate 105 may include the name, date of birth, phone number, driver's license number, social security number, residence address, biometric information (e.g., fingerprint data, voice data), and/or mailing address of the candidate 105. The enrollment information may also include: an indication whether the candidate 105 is also requesting a report, email address(es) to send the report, and/or work location. A unique identifier that identifies the candidate 105 may be generated by the enrollment module 140.

At operation 2, the data monitor 145 of the continuous background check monitoring computing system 120 electronically monitors multiple data sources that include background check information for data related to the candidate. As shown in FIG. 1, the data monitor 145 automatically monitors background information data sources 125 for data related to the candidate 105. The background information data sources 125 may include one or more real-time data sources 130 and/or one or more periodic data sources 135. The data from the real-time data sources 130 may be pushed to the data monitor 145 with any updates corresponding to the candidate 105. The data monitor 145 may periodically query the periodic data source(s) 135 (e.g., daily, weekly, monthly).

The one or more real-time data sources 130 may include real-time arrest data and/or data from other completed background searches. The real-time arrest data may include information directly from prisons, jails, and/or holding cells for new arrest records. An arrest does not necessarily mean that an individual was or will be charged with a crime or that they are or will be convicted of a crime. The real-time arrest data may be used as a trigger to search for county criminal records for the individual (e.g., 30, 60, 90 days, etc. to allow sufficient time for the arrest record to fully mature into a county court record).

The data from completed background searches may include data from county criminal searches that were performed at the request of the candidate 105 or from a different entity. Thus, a background check that is completed for the candidate 105 at the behest of a first entity may automatically trigger an update and potentially a follow-up background check to be performed at the behest of a second entity that has enrolled the same candidate 105 for continuous background check monitoring.

The data monitor 145 receives the data from the data sources 125 differently depending on the capabilities and configuration of the data source. For instance, if a data source is configured to push data records, the data monitor 145 may subscribe the candidate to a push feed where a record for the candidate is sent in real-time. If a data source is not configured to push data records, the data monitor 145 may form a query (depending on data source syntax rules) to search the data source. Different ones of the data sources 125 may have different requirements on the type and/or amount of candidate information. For instance, some data sources may require a first name, last name, date of birth, social security number, and driver's license number. Other data sources may not require a driver's license number, for example.

The one or more periodic data sources 135 may include information to perform a national criminal data search, a global watchlist data search, a sex offender registry data search, and/or electronic county criminal data search.

The national criminal data search identifies whether a candidate has potential criminal offenses. The national criminal data search may query hundreds to thousands of databases (e.g., various county and state agencies) for potential offenses. The results of the national criminal data search may be incomplete, lacking identifying information, and/or the final disposition of the criminal offense (e.g., whether the case was dismissed, whether the individual was convicted, etc.). In an embodiment, the results of the national criminal data search are used as a trigger to search for further detailed information such as determining which county records should be searched for criminal records including felonies, misdemeanors, and some infractions and traffic records, to confirm that the record belongs to the individual in question and to determine up-to-date case information (e.g., disposition, status).

The global watchlist data search identifies whether a candidate is listed on certain domestic and/or international watchlists or government sanctions lists (e.g., known terrorists, money launderers, and drug traffickers). The global watchlist data search may search multiple international, government, and regulatory databases that identify individuals who are on criminal lists or are either prohibited from certain industries such as healthcare and finance. The sources include: Office of Inspector General, European Union Consolidated List; Drug Enforcement Agency Fugitive list; Government sanction databases, and/or the US terrorist list.

The sex offender registry data search identifies whether a candidate is currently publicly registered as a sex offender. The sex offender registry data search may query sex offender registers in each state and/or a national database (e.g., the National Sex Offender Database (NSOPW)). The search results may include the type(s) of offenses that occurred and personal identifiers.

The electronic county criminal data search searches available electronic county criminal records (for those counties that have searchable data online). Most felony and misdemeanor cases are filed in county courts and data for all cases tried in local jurisdictions, regardless of disposition (guilty, dismissed, etc.), are housed at the county court. These records are often not reported to any national criminal database and are not found in a federal records search. The search results may include the defendant's name, case number, file date, charge level classification (e.g., felony, misdemeanor, etc.), charge name (e.g., assault), disposition (e.g., guilty, dismissed, etc.), disposition date, and sentencing information.

The data monitor 145 receives one or more records from the background information data sources 125 that may potentially belong to the candidate 105. Dependent on the data source, the record(s) may include all records that may potentially belong to the candidate 105, all records that may potentially belong to the candidate 105 over a particular time frame (e.g., the last year), or any record that is new or has been changed that may potentially belong to the candidate 105. These records may be incomplete and/or lacking identifying information that directly ties the results to the candidate 105. For instance, the name of the candidate 105 may not be consistent across all different data sources (e.g., a nickname may be used in place of a legal name). As another example, it is possible that a date of birth in certain record sources may only be a partial date of birth (e.g., just the year of birth). As another example, it may be possible for the SSN to be mismatched with the information of the candidate 105 but all other data be directly matching.

To mitigate against a record being falsely applied to the candidate 105, the identity matcher 150 performs a matching procedure to determine whether a found record belongs to the candidate 105. In an embodiment, the matching procedure uses probabilistic matching to calculate a similarity score between the candidate information and the information in the record. For instance, a similarity score may be calculated for each of the following: name, date of birth, address, driver's license number, and/or social security number. The similarity score may be population based (e.g., how many people share the information). For instance, roughly 11,000 people are born every day in the United States. Thus, a date of birth score can be approximated to be 11,000 divided by the total population of the United States if there is a fully matching DOB. As another example, the name of the candidate may be compared against national name statistics to determine how common the name is. Fuzzy matching may be used for each of the categories with possibly different fuzziness thresholds. For example, the name threshold may be different to account for name misspellings and nicknames when compared with a SSN fuzziness threshold (a mismatched SSN may produce a significant mismatch score). A final similarity score is computed based on each individual similarity score component. Those that have a high score may be automatically accepted as belonging to the candidate 105 whereas those that have lower scores may be manually reviewed prior to being determined as belonging to the candidate 105. If a manual review of a record is needed, a workflow may be triggered for a manual reviewer to review and complete the review. If the manual review determines that the record belongs to the candidate 105, the process continues.

A record received by the data monitor 145 may not be a new record. The new record determinator 160 determines whether a record is a new record including a substantive change (e.g., a disposition change). The new record determinator 160 may compare previous records matched to a candidate to determine whether the record in question is a new record (not seen by the system compared to a previous background check performed for the background check user such as the enroller 110). In a specific embodiment, the new record determinator 160 applies a machine learning algorithm on each field in the record to determine the likelihood that a field is the same or is different. Manual workflows may be utilized where the machine learning algorithm is unable to determine the similarity of a field beyond an acceptable threshold.

Thus, at operation 3, the identity matcher 150 matches the identity of the record information and the candidate information and the new record determinator 160 determines if the record is new. If the continuous background check monitoring computing system 120 determines a new record has been found that belongs to the candidate 105, the continuous background check monitoring computing system 120 determines whether a report is to be generated that describes the information. The report generation decision may be based on a set of rules including predefined rules and/or custom rules configured by the enroller 110. For instance, the rules may define what types of data are wanted, the types of data that are not wanted, and/or a timeframe that defines data that are wanted. To give an example, certain traffic violations (e.g., parking ticket, speeding, etc.) may not be wanted and therefore may not trigger a report. As another example, certain reports that are over one year may not be wanted and therefore may not trigger a report. Similarly, certain federal and state laws may control which records can be transmitted to a user. For example, a non-conviction record older than seven years old in the context of employment screening may not be included in a report.

The rule applier 155 applies the rule(s) set for the enroller 110 to determine whether the record is a new record of interest. If the record is a new record of interest, the report generator 165 automatically generates a report that describes the record. The report itself may be automatically transmitted to the enroller 110 and/or the candidate 105, and/or a notification may be transmitted to the enroller 110 and/or the candidate 105 with a link to the report. Thus, at operation 4, the report generator 165 automatically generates the report 115. The monitoring, discovering, and reporting a record does not automatically un-enroll the candidate 105 from continuous background check monitoring which will continually run until the candidate 105 is unenrolled.

Figure 2:
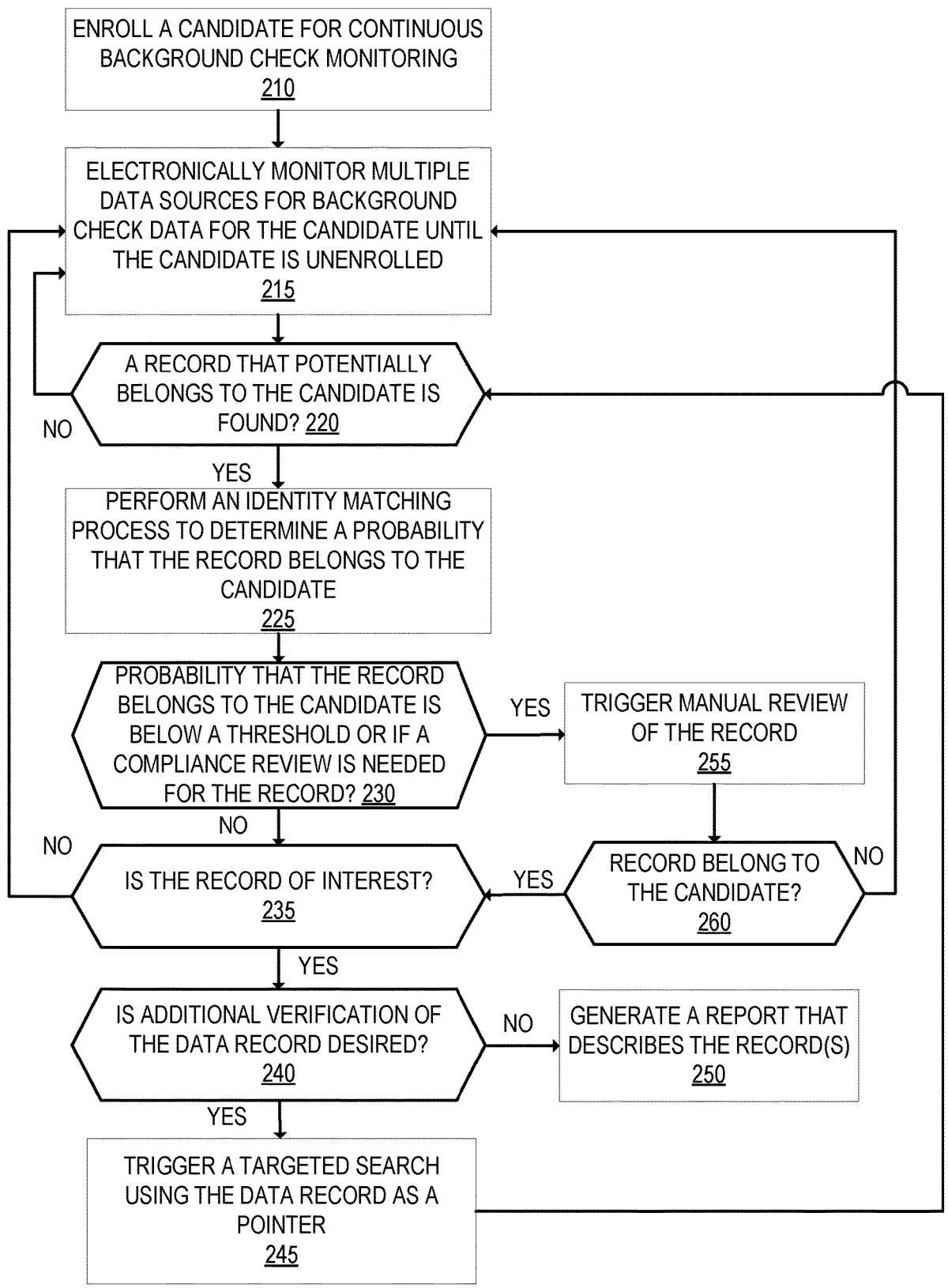
FIG. 2 is a flow diagram that illustrates exemplary operations for continuous background check monitoring according to an embodiment.

FIG. 2 is a flow diagram that illustrates exemplary operations for continuous background check monitoring according to an embodiment. The operations of FIG. 2 are described in reference to the exemplary embodiment of FIG. 1. However, the operations of FIG. 2 can be performed by different embodiments than those described with respect to FIG. 1, and the embodiment described with respect to FIG. 1 can perform different operations than those described in FIG. 2.

At operation 210, the enrollment module 140 of the continuous background check monitoring computing system 120 enrolls a candidate 105 for continuous background check monitoring. As part of enrolling the candidate 105, candidate information fields such as PII of the candidate 105 may be received from the candidate and/or the enroller. The candidate information may include the name, date of birth, phone number, driver's license number, social security number, residence address, and/or mailing address of the candidate 105. The enrollment information may also include: an indication whether the candidate 105 is also requesting a report, email address(es) to send the report, and/or work location.

Next, at operation 215, the data monitor 145 repeatedly and automatically electronically monitors multiple background information data sources 125 for background check data for the candidate 105 until the candidate 105 is unenrolled. In an embodiment, at least one of the data sources provides real-time information and may be pushed to the data monitor 145. The data monitor 145 may periodically query data sources (e.g., daily weekly, monthly) for data of the candidate 105. The background information data sources may include: real-time arrest data, data from completed background searches, national criminal data, global watchlist data, sex offender registry data, and/or electronic county criminal data, as described previously.

Next, at operation 220, the data monitor 145 determines whether, from the electronic monitoring, a record has been found that potentially belongs to the candidate 105. If a record has been found that potentially belongs to the candidate 105, then operation 225 is performed. If a record has not been found that potentially belongs to the candidate 105, then operation 215 is performed repeatedly until the candidate is unenrolled (operation 215 is performed repeatedly even if a record is found). A record that is found includes data record information fields. The data record information fields may be partially or the same as the candidate information fields.

A record that potentially belongs to the candidate may not belong to the candidate 105 due to various reasons such as incomplete and/or lack of identifying information in the record as previously described. At operation 225, the identity matcher 150 performs a matching procedure to determine a probability that the record belongs to the candidate 105. As previously described, the matching procedure may use probabilistic matching to calculate a probability that the record belongs to the candidate 105. Next, at operation 230, the identity matcher 150 determines whether the calculated probability that the record belongs to the candidate is below a threshold or if a compliance review is needed for the record. Certain records may require manual review for completeness, accuracy, data normalization, etc. before being included on a background check. In other cases, a compliance review may be determined to be needed depending on the severity of the record (e.g., a criminal record likely to result in an adverse employment decision).

If the probability score is not below the threshold and if a compliance review of the record is not needed, then operation 235 is performed. If the probability score is below the threshold or if a compliance review is needed, then operation 255 is performed where the continuous background check monitoring computing system triggers a manual review of the record to determine if it belongs to the candidate 105, and then operation 260 is performed to determine if the continuous background check monitoring computing system receives an indication that the record belongs to the candidate 250 as a result of the manual review. If it does, then operation 235 is performed; otherwise operations move back to operation 215.

At operation 235, the rule applier 155 determines whether the record is of interest. Some records may not be of interest because of the type of record and/or the age of the information included in the record, for example. As previously described, rules may define the types of data that are of interest, the types of data that are not of interest, a timeframe of the data that is of interest, and/or a timeframe of the data that is not of interest. The rules may be configured by the enroller 110 and/or set by the continuous background check monitoring computing system. If the record is not of interest, then flow moves back to operation 215. If the record is of interest, then operation 240 is performed.

At operation 240, a determination is made whether an additional verification of the data record is desired. The additional verification may include running a targeted search in a county level search (e.g., a county criminal record search) to verify the accuracy and completeness of the data record. The determination to perform an additional verification may differ based on the type of record and/or the record data search source. For instance, a national database may not be as accurate or complete as a local county level search. A record from a national database can be used as a pointer, or a hint, to a local county level search that can validate whether the record from the national database is complete and/or provide further information about the record. Some records, however, may not require further verification depending on either the intended use of the background check or the data's source. For instance, a targeted county search may not be necessary for a sexual offender status data record as such status is not housed at the county court level. As another example, a targeted search may not be necessary where the intended use of the data is outside of the employment context or where different standards for completeness exist.

At operation 245, the record of interest triggers a targeted search using the data record as a pointer. The targeted search may be done periodically to allow for sufficient time for further information to be received. For example, an arrest record may be used as a trigger to search for county criminal records for the individual (e.g., 30, 60, 90 days, etc. to allow sufficient time for the arrest record to fully mature into a county court record). Flow then moves back to operation 220 where a determination is made whether a record is found that belongs to the candidate.

If a targeted search is not to be run, then operation 250 is performed where the report generator 165 automatically generates a report that describes the record. If the record is an updated version of a previous record (e.g., the disposition status has changed), the record may describe the change. The report may be automatically transmitted to the enroller 110 and/or the candidate 105, and/or a notification may be transmitted to the enroller 110 and/or the candidate 105 with a link to the report.

Figure 3:
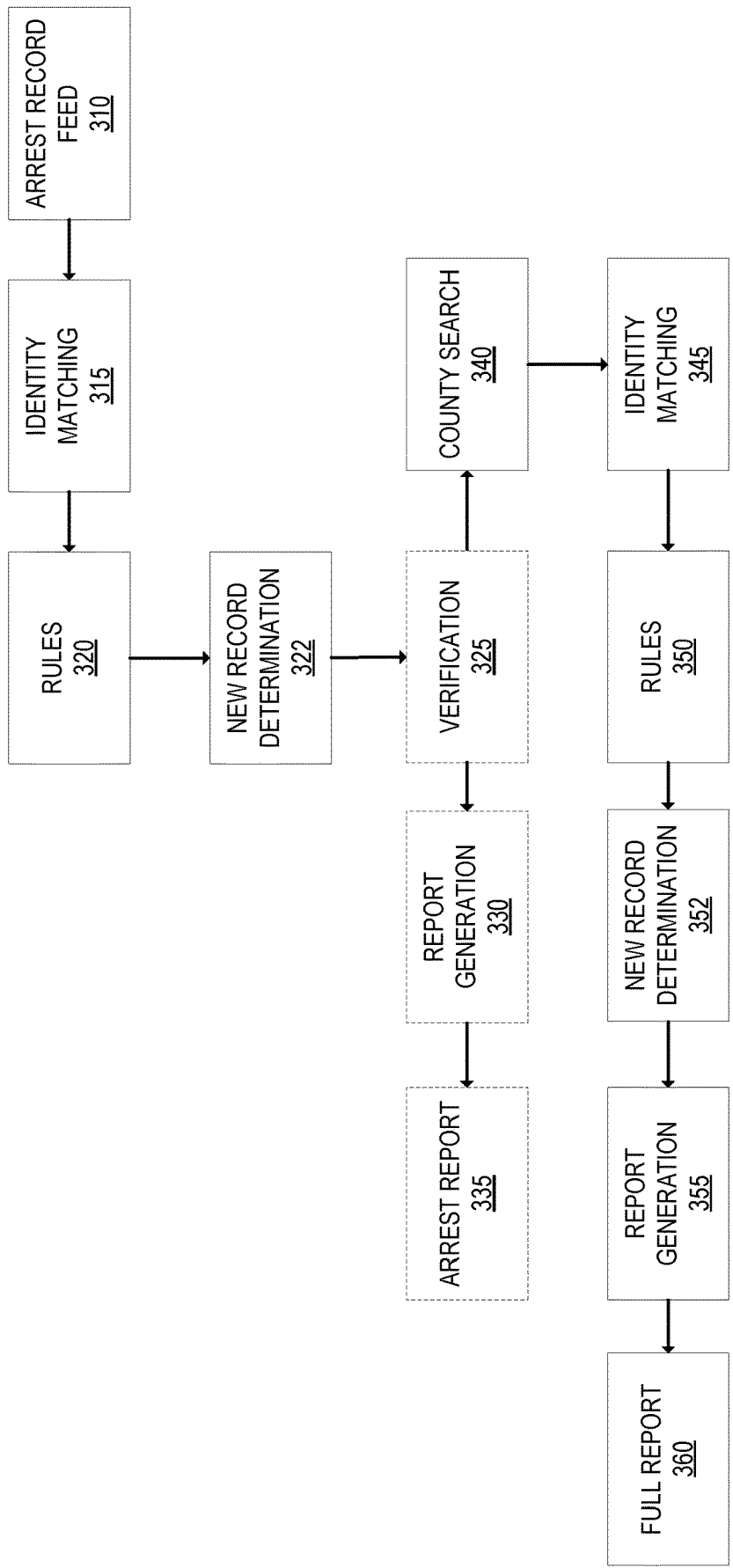
FIG. 3 is a block diagram that illustrates an exemplary process for processing an arrest record received by the continuous background check monitoring system according to an embodiment.

FIG. 3 is a block diagram that illustrates an exemplary process for processing an arrest record received by the continuous background check monitoring system according to an embodiment.

An arrest record is received from an arrest record feed 310 that may belong to a candidate. The arrest record is received by the data monitor 145 (either pushed or queried from a real-time data source). The arrest record may not include information about whether a criminal charge has been made and/or a disposition of any criminal charge. Next, the identity matcher 150 performs an identity matching at 315 to determine the probability that the arrest record belongs to the candidate (that is, the arrest record indicates that the candidate in question has been arrested). As previously described, the identity matching may use probabilistic matching. Assuming that the record belongs to the candidate, the rule applier 155 applies the rules 320 to determine whether the arrest record is of interest to the candidate 105 and/or the enroller 110. For instance, certain arrests may not be of interest to the enroller and/or if the arrest date is older than a certain date it may not be of interest to the enroller.

Assuming that the arrest record is of interest, then the new record determinator 160 determines whether the record is a new record 322 in a similar way as previously described. Assuming that the record is a new record, then an optional verification 325 operation is performed. The verification operation may include a manual review of the arrest record to confirm whether the arrest record belongs to the candidate in question. In an embodiment, a manual review is performed only if the probability that the arrest record belongs to the candidate is below a threshold.

Optionally, the report generator 165 may perform the report generation 330 to produce the arrest report 335. This report includes information from the arrest record feed and may not include information that was not included in the arrest record feed such as a final case disposition, sentencing information, etc.

The arrest record may also trigger a county criminal search 340 to be performed. The arrest record includes information that can be used as a data pointer to assist in the county criminal search (e.g., such as a location of the jail and/or where the arrest was made). The county criminal search 340 may include accessing an online county search if available, or if not available, instructing a court researcher to manually review county criminal records. The county criminal search 340 may be run periodically (e.g., 30, 60, 90 days) to allow sufficient time for the arrest record to fully mature into a county court record.

If the county criminal search 340 reveals new information about the arrest and/or subsequent county court record, the identity matcher 150 performs an identity matching 345 to determine the probability that the county search record belongs to the candidate. The identity matching may be performed in a similar way as previously described. A manual review of the county criminal search record may also be performed. For instance, a manual review may be determined to be performed depending on the severity of the criminal charge and/or disposition (e.g., felonies may be manually reviewed). As another example, a manual review may be determined to be performed if the county criminal search record has incomplete information and/or otherwise the probability score is below the threshold.

Next, after determining that the county criminal search record belongs to the candidate, the rule applier 155 applies the rules 350 (which may be the same as the rules 320) to determine whether the county criminal search record is of interest to the candidate 105 and/or the enroller 110. Assuming that the record is of interest, then the new record determinator 160 determines whether the record is a new record 352 in a similar way as previously described. Assuming that the record is a new record, then the report generator 165 may perform the report generation 355 to produce the report 360. This report includes may include information from the arrest record feed and the results of the county criminal search.

Figure 4:
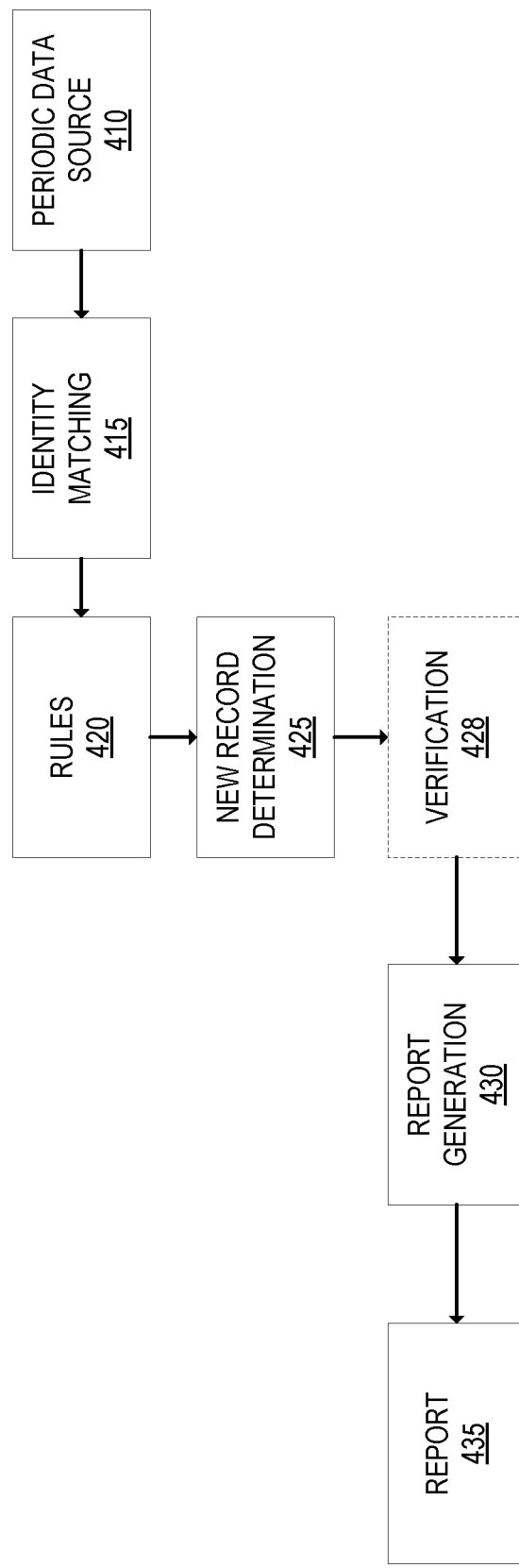
FIG. 4 is a block diagram that illustrates an exemplary process for processing a record received from a periodic data source at the continuous background check monitoring system according to an embodiment.

FIG. 4 is a block diagram that illustrates an exemplary process for processing a record received from a periodic data source at the continuous background check monitoring system according to an embodiment.

A data record is received from a periodic data source 410 that may belong to a candidate. The record is received by the data monitor 145 (either pushed or queried from a periodic data source). Next, the identity matcher 150 performs an identity matching at 415 to determine the probability that the record belongs to the candidate. As previously described, the identity matching may use probabilistic matching. Assuming that the record belongs to the candidate, the rule applier 155 applies the rules 420 to determine whether the record is of interest to the candidate 105 and/or the enroller 110. Assuming that the record is of interest, then the new record determinator 160 determines whether the record is a new record 425 in a similar way as previously described. Assuming that the record is a new record, then an optional verification 428 operation is performed. The verification operation may include a manual review of the record to confirm whether the record belongs to the candidate in question. In an embodiment, a manual review is performed only if the probability that the record belongs to the candidate is below a threshold or if it is determined that the record should be reviewed for compliance reasons. Next, the report generator 165 performs the report generation 430 to produce the report 435. This report includes may include information from the arrest record feed and the results of the county criminal search.

Figure 5:
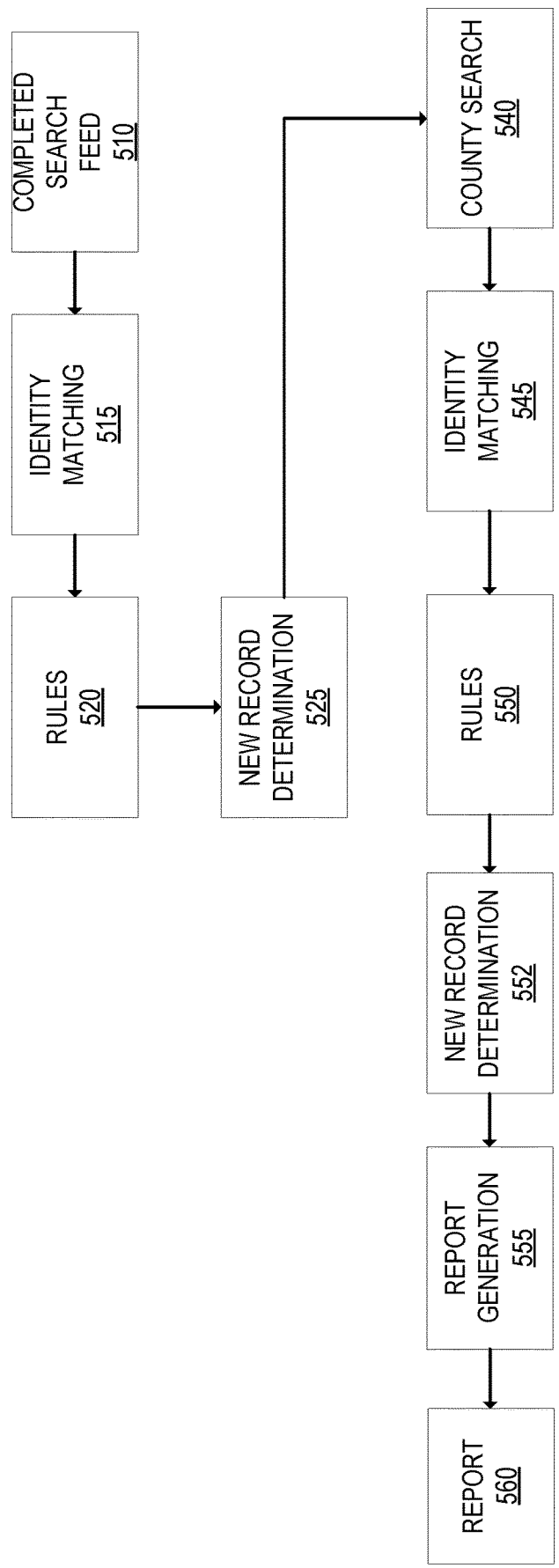
FIG. 5 is a block diagram that illustrates an exemplary process for processing a record received from a completed search feed at the continuous background check monitoring system according to an embodiment.

FIG. 5 is a block diagram that illustrates an exemplary process for processing a record received from a completed search feed at the continuous background check monitoring system according to an embodiment.

A data record is received from a completed search feed 510 that may belong to a candidate. The record is received by the data monitor 145 and pushed by the completed search feed. The data from completed background searches may include data from county criminal searches and other background searches that were performed at the request of the candidate 105 or from a different entity. Next, the identity matcher 150 performs an identity matching at 515 to determine the probability that the record belongs to the candidate. In an embodiment, the identity matching at 515 determines whether the same social security number is associated with the candidate from the completed search feed with the social security number of the candidate in question. Assuming that the record belongs to the candidate, the rule applier 155 applies the rules 520 to determine whether the record is of interest to the candidate 105 and/or the enroller 110. Assuming that the record is of interest, then the new record determinator 160 determines whether the record is a new record 525 in a similar way as previously described.

It may be determined that an additional verification of the data record is desired, such as running a targeted search in a county level search (e.g., a county criminal record search) to verify the correctness of the data record. If an additional verification is desired, the county criminal search 540 is triggered to be performed. The county criminal search 540 may include accessing an online county search if available, or if not available, instructing a court researcher to manually review county criminal records. The county criminal search 540 may be run periodically (e.g., 30, 60, 90 days) to allow sufficient time for the arrest record to fully mature into a county court record.

If the county criminal search 540 reveals new information about the record, the identity matcher 150 performs an identity matching 545 to determine the probability that the county search record belongs to the candidate. The identity matching may be performed in a similar way as previously described. A manual review of the county criminal search record may also be performed. For instance, a manual review may be determined to be performed depending on the severity of the criminal charge and/or disposition (e.g., felonies may be manually reviewed). As another example, a manual review may be determined to be performed if the county criminal search record has incomplete information and/or otherwise the probability score is below the threshold.

Next, after determining that the county criminal search record belongs to the candidate, the rule applier 155 applies the rules 550 (which may be the same as the rules 520) to determine whether the county criminal search record is of interest to the candidate 105 and/or the enroller 110. Assuming that the record is of interest, then the new record determinator 160 determines whether the record is a new record 552 in a similar way as previously described. Assuming that the record is a new record, then the report generator 165 may perform the report generation 555 to produce the report 560. This report includes may include information from the completed search feed and the results of the county criminal search.

The continuous background check monitoring system described herein improves the background check process. If the system determines a change has occurred to a candidate's background check information, the continuous background check monitoring system can alert the employer (or other entity requesting monitoring of the candidate's background check information) of the change and/or automatically trigger follow-up searches in the appropriate jurisdictions to generate a new background check report. This enables users of background checks to dramatically reduce the time between reportable criminal events existing in public records, and the time they become aware of those events and take appropriate action. In the employment context, this improves overall work safety and risk management practices by providing employers with near real-time information regarding their workforce and enabling them to take appropriate. Additionally, the enrollment of individuals into the continuous background check monitoring system can enable users to delay decisions until further information becomes available. For example, where a pending criminal record appears statically on a traditional background check, information on an enrolled candidate may be updated when the public record information changes. This can enable employers to delay pre-employment decisions until more information becomes available without the time and expense of ordering a new background check.

Figure 6:
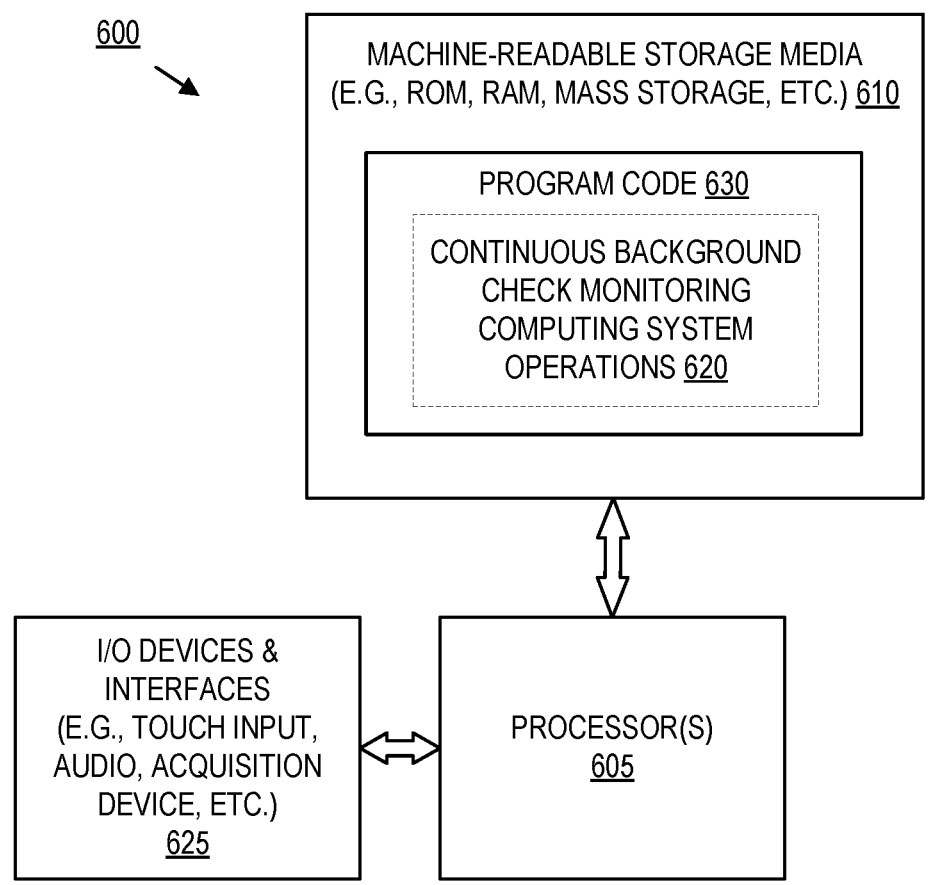
FIG. 6 illustrates a block diagram for an exemplary data processing system that may be used in some embodiments.

FIG. 6 illustrates a block diagram for an exemplary data processing system 600 that may be used in some embodiments. Data processing system 600 includes one or more processors 605 and connected system components (e.g., multiple connected chips). One or more such data processing systems 600 may be utilized to implement the embodiments and operations described with respect to the continuous background check monitoring computing system or other electronic device.

The data processing system 600 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 610 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processor(s) 605. For example, the depicted machine-readable storage media 610 may store program code 630 that, when executed by the processor(s) 605, causes the data processing system 600 to execute the continuous background check monitoring computing system operations 620 described herein.

The data processing system 600 also includes one or more input or output ("I/O") devices and interfaces 625, which are provided to allow a user to provide input to, receive output from, and otherwise transfer data to and from the system. These I/O devices 625 may include a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. The I/O devices and interfaces 625 may include wireless transceivers, such as an IEEE 802.11 transceiver, an infrared transceiver, a Bluetooth transceiver, a wireless cellular telephony transceiver (e.g., 2G, 3G, 4G, 5G), an NFC transceiver, or another wireless protocol to connect the data processing system 600 with another device, external component, or a network and receive stored instructions, data, tokens, etc. For instance, a wired or wireless transceiver may transmit and receive messages to and from the continuous background check monitoring computing system as described herein.

Additional components, not shown, may also be part of the system 600, and, in certain embodiments, fewer components than that shown in FIG. 6 may also be used in a data processing system 600. One or more buses may be used to interconnect the various components shown in FIG. 6.

The techniques shown in the figures can be implemented using code and data stored and executed on one or more electronic devices (e.g., a continuous background check monitoring computing system). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

In the preceding description, numerous specific details are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the preceding description and the claims, the terms "coupled" and "connected," along with their derivatives, may be used. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
receiving enrollment information to enroll a candidate for continuous background check monitoring, wherein the enrollment information includes candidate information including a plurality of personal identifiable information fields of the candidate;
electronically monitoring a plurality of data sources that include background check information for background check data of the candidate, wherein the electronically monitoring is performed repeatedly until the candidate is unenrolled, and wherein at least one of the plurality of data sources provides real-time information;
receiving a first data record from at least one of the electronically monitored data sources, wherein the first data record includes a first plurality of data record information fields of personal identifiable information;
performing an identity matching process using probabilistic matching to determine a probability that the first data record includes information about the candidate, wherein performance of the identity matching process includes the following:
for each of the first plurality of data record information fields included in the first data record, calculating a similarity score component for that data record information field compared to a corresponding personal identifiable field of the candidate, and
computing a first final similarity score based on each individual similarity score component of the first plurality of data record information fields, wherein the first final similarity score represents the probability that the first data record includes information about the candidate;
determining, from the computed first final similarity score, that the probability that the first data record includes information about the candidate exceeds a threshold;
subsequent to the determining that the probability that the first data record includes information about the candidate exceeds the threshold, applying a set of one or more custom rules to the first data record to determine whether the first data record is of interest, wherein the set of one or more custom rules are configured by an entity that caused the candidate to be enrolled and that define types of data records that are of interest or types of data records that are not of interest, wherein applying the set of custom rules to the first data record indicates that the first data record is not of interest;
receiving a second data record from at least one of the electronically monitored data sources, wherein the second data record includes a second plurality of data record information fields of personal identifiable information;
performing the identity matching process using probabilistic matching to determine a probability that the second data record includes information about the candidate, wherein performing the identity matching process includes performing the following:
for each of the second plurality of data record information fields included in the second data record, calculating a similarity score component for that data record information field compared to a corresponding personal identifiable field of the candidate, and
computing a second final similarity score based on each individual similarity score component of the second plurality of data record information fields, wherein the second final similarity score represents the probability that the second data record includes information about the candidate;
determining, from the computed second final similarity score, that the probability that the second data record includes information about the candidate exceeds the threshold;
subsequent to the determining that the probability that the second data record includes information about the candidate exceeds the threshold, applying the set of one or more custom rules to determine whether the second data record is of interest, wherein applying the set of custom rules to the second data record indicates that the second data record is of interest;
determining to verify the second data record;
responsive to determining to verify the second data record, using the second data record as a pointer to trigger a county records search to be performed periodically at least multiple times to verify the second data record;
receiving results of the county records search, wherein the results verify the information in the second data record;
automatically generating a report that describes the second data record;
transmitting a notification of the report to the entity that caused the candidate to be enrolled for continuous background check monitoring;
receiving a third data record from at least one of the electronically monitored data sources, wherein the third data record includes a third plurality of data record information fields of personal identifiable information;
performing the identity matching process using probabilistic matching to determine a probability that the third data record includes information about the candidate, wherein performing the identity matching process includes performing the following:
for each of the third plurality of data record information fields included in the third data record, calculating a similarity score component for that data record information field compared to a corresponding personal identifiable field of the candidate, and
computing a third final similarity score based on each individual similarity score component of the third plurality of data record information fields, wherein the third final similarity score represents the probability that the third data record includes information about the candidate;
determining, from the computed third final similarity score, that the probability that the third data record includes information about the candidate is below the threshold, and responsive to that determination, triggering a manual review of the third data record to determine whether the third data record includes information about the candidate;

receiving a fourth data record from at least one of the electronically monitored data sources, wherein the fourth data record includes a fourth plurality of data record information fields of personal identifiable information;

performing the identity matching process using probabilistic matching to determine a probability that the fourth data record includes information about the candidate, wherein performing the identity matching process includes performing the following:

for each of fourth plurality of data record information fields included in the fourth data record, calculating a similarity score component for that data record information field compared to a corresponding personal identifiable field of the candidate, and computing a fourth final similarity score based on each individual similarity score component of the fourth plurality of data record information fields, wherein the fourth final similarity score represents the probability that the fourth data record includes information about the candidate;

determining, from the computed fourth final similarity score, that the probability that the fourth data record includes information about the candidate exceeds the threshold;

subsequent to the determining that the probability that the fourth data record includes information about the candidate exceeds the threshold, applying the set of one or more custom rules to determine whether the fourth data record is of interest, wherein applying the set of custom rules to the fourth data record indicates that the fourth data record is of interest;

comparing the fourth data record with previous data records that have been determined as having information of the candidate to determine whether the fourth data record includes new information, wherein the comparison uses a machine learning algorithm as applied to each field in the fourth data record to determine a likelihood whether that field has new information, and wherein a result of the comparison is that the fourth data record includes new information; and automatically generating a report that describes the fourth data record.

2. The method of claim 1, wherein electronically monitoring the plurality of data sources includes periodically querying one or more of the plurality of data sources.

3. The method of claim 1, wherein electronically monitoring the plurality of data sources includes receiving pushed data from one or more of the plurality of data sources.

4. The method of claim 1, further comprising:
wherein the second data record indicates an arrest of the candidate, wherein the second data record includes a county in which the arrest occurred; and
wherein the county records search is performed to determine details of the arrest and details of any disposition corresponding to the arrest.

5. The method of claim 1, wherein the second data record is an arrest record that includes information about an arrest, and wherein at least some of the information about the arrest is used as the pointer in the county records search.

6. The method of claim 1, wherein the set of one or more custom rules further define a timeframe that defines data that is of interest, and wherein the first data record is not included in the report as a result of the determination that the first data record is not of interest.

7. The method of claim 1, wherein the similarity score component for each of the first plurality of data record information fields is population based.

8. A non-transitory machine-readable storage medium that provides instructions that, when executed by a processor, causes said processor to carry out operations comprising:

receiving enrollment information to enroll a candidate for continuous background check monitoring, wherein the enrollment information includes candidate information including a plurality of personal identifiable information fields of the candidate;

electronically monitoring a plurality of data sources that include background check information for background check data of the candidate, wherein the electronically monitoring is performed repeatedly until the candidate is unenrolled, and wherein at least one of the plurality of data sources provides real-time information;

receiving a first data record from at least one of the electronically monitored data sources, wherein the first data record includes a first plurality of data record information fields of personal identifiable information;

performing an identity matching process using probabilistic matching to determine a probability that the first data record includes information about the candidate, wherein performing the identity matching process includes performing the following:

for each of the first plurality of data record information fields included in the first data record, calculating a similarity score component for that data record information field compared to a corresponding personal identifiable field of the candidate, and computing a first final similarity score based on each individual similarity score component of the first plurality of data record information fields, wherein the first final similarity score represents the probability that the first data record includes information about the candidate;

determining, from the computed first final similarity score, that the probability that the first data record includes information about the candidate exceeds a threshold;

subsequent to the determining that the probability that the first data record includes information about the candidate exceeds the threshold, applying a set of one or more custom rules to the first data record to determine whether the first data record is of interest, wherein the set of one or more custom rules are configured by an entity that caused the candidate to be enrolled and that define types of data records that are of interest or types of data records that are not of interest, wherein applying the set of custom rules to the first data record indicates that the first data record is not of interest;

receiving a second data record from at least one of the electronically monitored data sources, wherein the second data record includes a second plurality of data record information fields of personal identifiable information;

performing the identity matching process using probabilistic matching to determine a probability that the second data record includes information about the candidate, wherein performing the identity matching process includes performing the following:

for each of the second plurality of data record information fields included in the second data record, calculating a similarity score component for that data record information field compared to a corresponding personal identifiable field of the candidate, and computing a second final similarity score based on each individual similarity score component of the second plurality of data record information fields, wherein the second final similarity score represents the probability that the second data record includes information about the candidate;

determining, from the computed second final similarity score, that the probability that the second data record includes information about the candidate exceeds the threshold;

subsequent to the determining that the probability that the second data record includes information about the candidate exceeds the threshold, applying the set of one or more custom rules to determine whether the second data record is of interest, wherein applying the set of custom rules to the second data record indicates that the second data record is of interest;

determining to verify the second data record;

responsive to determining to verify the second data record, using the second data record as a pointer to trigger a county records search to be performed periodically at least multiple times to verify the second data record;

receiving results of the county records search, wherein the results verify the information in the second data record;

automatically generating a report that describes the second data record;

transmitting a notification of the report to the entity that caused the candidate to be enrolled for continuous background check monitoring;

receiving a third data record from at least one of the electronically monitored data sources, wherein the third data record includes a third plurality of data record information fields of personal identifiable information;

performing the identity matching process using probabilistic matching to determine a probability that the third data record includes information about the candidate, wherein performing the identity matching process includes performing the following:

for each of the third plurality of data record information fields included in the third data record, calculating a similarity score component for that data record information field compared to a corresponding personal identifiable field of the candidate, and computing a third final similarity score based on each individual similarity score component of the third plurality of data record information fields, wherein the third final similarity score represents the probability that the third data record includes information about the candidate;

determining, from the computed third final similarity score, that the probability that the third data record includes information about the candidate is below the threshold, and responsive to that determination, triggering a manual review of the third data record to determine whether the third data record includes information about the candidate;

receiving a fourth data record from at least one of the electronically monitored data sources, wherein the fourth data record includes a fourth plurality of data record information fields of personal identifiable information;

performing the identity matching process using probabilistic matching to determine a probability that the fourth data record includes information about the candidate, wherein performing the identity matching process includes performing the following:

for each of fourth plurality of data record information fields included in the fourth data record, calculating a similarity score component for that data record information field compared to a corresponding personal identifiable field of the candidate, and computing a fourth final similarity score based on each individual similarity score component of the fourth plurality of data record information fields, wherein the fourth final similarity score represents the probability that the fourth data record includes information about the candidate;

determining, from the computed fourth final similarity score, that the probability that the fourth data record includes information about the candidate exceeds the threshold;

subsequent to the determining that the probability that the fourth data record includes information about the candidate exceeds the threshold, applying the set of one or more custom rules to determine whether the fourth data record is of interest, wherein applying the set of custom rules to the fourth data record indicates that the fourth data record is of interest;

comparing the fourth data record with previous data records that have been determined as having information of the candidate to determine whether the fourth data record includes new information, wherein the comparison uses a machine learning algorithm as applied to each field in the fourth data record to determine a likelihood whether that field has new information, and wherein a result of the comparison is that the fourth data record includes new information; and automatically generating a report that describes the fourth data record.

9. The non-transitory machine-readable storage medium of claim 8, wherein electronically monitoring the plurality of data sources includes periodically querying one or more of the plurality of data sources.

10. The non-transitory machine-readable storage medium of claim 8, wherein electronically monitoring the plurality of data sources includes receiving pushed data from one or more of the plurality of data sources.

11. The non-transitory machine-readable storage medium of claim 8, wherein the operations further comprise:

wherein the second data record indicates an arrest of the candidate, wherein the second data record includes a county in which the arrest occurred; and wherein the county records search is performed to determine details of the arrest and details of any disposition corresponding to the arrest.

12. The non-transitory machine-readable storage medium of claim 8, wherein the second data record is an arrest record that includes information about an arrest, and wherein at least some of the information about the arrest is used as the pointer in the county records search.

13. The non-transitory machine-readable storage medium of claim 8, wherein the set of one or more custom rules further define a timeframe that defines data that is of interest, and wherein the first data record is not included in the report as a result of the determination that the first data record is not of interest.

14. The non-transitory machine-readable storage medium of claim 8, wherein the similarity score component for each of the first plurality of data record information fields is population based.

15. A server, comprising:
a processor;
a non-transitory machine-readable storage medium that provides instructions that, if executed by the processor causes the server to perform the following operations:
receiving enrollment information to enroll a candidate for continuous background check monitoring, wherein the enrollment information is to include candidate information including a plurality of personal identifiable information fields of the candidate;
electronically monitor a plurality of data sources that include background check information for background check data of the candidate, wherein the electronically monitoring is to be performed repeatedly until the candidate is unenrolled, and wherein at least one of the plurality of data sources is to provide real-time information;
receive a first data record from at least one of the electronically monitored data sources, wherein the first data record is to include a first plurality of data record information fields of personal identifiable information;
perform an identity matching process using probabilistic matching to determine a probability that the first data record includes information about the candidate, wherein performing the identity matching process includes performing the following:
for each of the first plurality of data record information fields included in the first data record, calculate a similarity score component for that data record information field compared to a corresponding personal identifiable field of the candidate, and
compute a first final similarity score based on each individual similarity score component of the first plurality of data record information fields, wherein the first final similarity score represents the probability that the first data record includes information about the candidate;
determine, from the computed first final similarity score, that the probability that the first data record includes information about the candidate exceeds a threshold;
subsequent to the determination that the probability that the first data record includes information about the candidate exceeds the threshold, apply a set of one or more custom rules to the first data record to determine whether the first data record is of interest, wherein the set of one or more custom rules are to be configured by an entity that caused the candidate to be enrolled and that define types of data records that are of interest or types of data records that are not of interest, wherein application of the set of custom rules to the first data record indicates that the first data record is not of interest;
receive a second data record from at least one of the electronically monitored data sources, wherein the second data record is to include a second plurality of data record information fields of personal identifiable information;
perform the identity matching process using probabilistic matching to determine a probability that the second data record includes information about the candidate, wherein performance of the identity matching process includes the following:
for each of the second plurality of data record information fields included in the second data record, calculate a similarity score component for that data record information field compared to a corresponding personal identifiable field of the candidate, and
compute a second final similarity score based on each individual similarity score component of the second plurality of data record information fields, wherein the second final similarity score represents the probability that the second data record includes information about the candidate;
determine, from the computed second final similarity score, that the probability that the second data record includes information about the candidate exceeds the threshold;
subsequent to the determination that the probability that the second data record includes information about the candidate exceeds the threshold, apply the set of one or more custom rules to determine whether the second data record is of interest, wherein applying the set of custom rules to the second data record indicates that the second data record is of interest;
determine to verify the second data record;
responsive to the determination to verify the second data record, use the second data record as a pointer to trigger a county records search to be performed periodically at least multiple times to verify the second data record;
receive results of the county records search, wherein the results verify the information in the second data record;
automatically generate a report that describes the second data record;
transmit a notification of the report to the entity that caused the candidate to be enrolled for continuous background check monitoring;
receive a third data record from at least one of the electronically monitored data sources, wherein the third data record is to include a third plurality of data record information fields of personal identifiable information;
perform the identity matching process using probabilistic matching to determine a probability that the third data record includes information about the candidate, wherein performance of the identity matching process includes the following:
for each of the third plurality of data record information fields included in the third data record, calculate a similarity score component for that data record information field compared to a corresponding personal identifiable field of the candidate, and
compute a third final similarity score based on each individual similarity score component of the third plurality of data record information fields, wherein the third final similarity score represents the probability that the third data record includes information about the candidate;
determine, from the computed third final similarity score, that the probability that the third data record includes information about the candidate is below the threshold, and responsive to that determination, trigger a manual review of the third data record to determine whether the third data record includes information about the candidate;

receive a fourth data record from at least one of the electronically monitored data sources, wherein the fourth data record is to include a fourth plurality of data record information fields of personal identifiable information;

perform the identity matching process using probabilistic matching to determine a probability that the fourth data record includes information about the candidate, wherein performance of the identity matching process includes performing the following:

for each of fourth plurality of data record information fields included in the fourth data record, calculate a similarity score component for that data record information field compared to a corresponding personal identifiable field of the candidate, and compute a fourth final similarity score based on each individual similarity score component of the fourth plurality of data record information fields, wherein the fourth final similarity score represents the probability that the fourth data record includes information about the candidate;

determine, from the computed fourth final similarity score, that the probability that the fourth data record includes information about the candidate exceeds the threshold;

subsequent to the determination that the probability that the fourth data record includes information about the candidate exceeds the threshold, apply the set of one or more custom rules to determine whether the fourth data record is of interest, wherein application of the set of custom rules to the fourth data record indicates that the fourth data record is of interest;

compare the fourth data record with previous data records that have been determined as having information of the candidate to determine whether the fourth data record includes new information, wherein the comparison uses a machine learning algorithm as applied to each field in the fourth data record to determine a likelihood whether that field has new information, and wherein a result of the comparison is that the fourth data record includes new information; and automatically generate a report that describes the fourth data record.

16. The server of claim 15, wherein electronically monitoring of the plurality of data sources is to include a periodic querying of one or more of the plurality of data sources.

17. The server of claim 15, wherein electronically monitoring the plurality of data sources is to include receipt of pushed data from one or more of the plurality of data sources.

18. The server of claim 15, wherein the second data record indicates an arrest of the candidate, wherein the second data record includes a county in which the arrest occurred, and wherein the county records search is performed to determine details of the arrest and details of any disposition corresponding to the arrest.

19. The server of claim 15, wherein the second data record is an arrest record that includes information about an arrest, and wherein at least some of the information about the arrest is used as the pointer in the county records search.

20. The server of claim 15, wherein the set of one or more custom rules further define a timeframe that defines data that is of interest, and wherein the first data record is not included in the report as a result of the determination that the first data record is not of interest.

21. The server of claim 15, wherein the similarity score component for each of the first plurality of data record information fields is population based.

* * * * *